United States Patent

[11] 3,593,492

| [72] | Inventor | Arnodous Cornelis Wilhelmus Maria Frankefort<br>Min. Charles Ruysstraat 18, Venray, Netherlands |
|---|---|---|
| [21] | Appl. No. | 745,942 |
| [22] | Filed | July 18, 1968 |
| [45] | Patented | July 20, 1971 |
| [32] | Priority | July 20, 1967 |
| [33] | | Great Britain |
| [31] | | 33474/67 |

[54] APPARATUS FOR THE PACKAGING OF PRODUCTS
24 Claims, 9 Drawing Figs.

[52] U.S. Cl. ........................... 53/184, 53/372
[51] Int. Cl. ........................... B65b 47/02
[50] Field of Search ........................... 53/29, 30, 184, 389, 180, 372, 373

[56] References Cited
UNITED STATES PATENTS

| 2,896,387 | 7/1959 | Brock | 53/184 X |
| 2,970,414 | 2/1961 | Rohdin | 53/30 X |
| 3,267,639 | 8/1966 | Ollier et al. | 53/184 X |

*Primary Examiner*—Theron E. Condon
*Assistant Examiner*—E. F. Desmond
*Attorney*—Shapiro and Shapiro

ABSTRACT: The invention relates to apparatus for packaging products and having a continuous conveyor with an intermittent step-by-step movement and which conveys a film of thermoplastic sheet material. This material is softened by heat or any other way, shaped into a series of depressions into which products may be placed. Cardboards are automatically fed into position and placed over the depressions in the thermoplastic material and sealed around the products on to the board and, at the same time, the sheet material is cut around the sealed portion. The invention also includes the complete package made in this way.

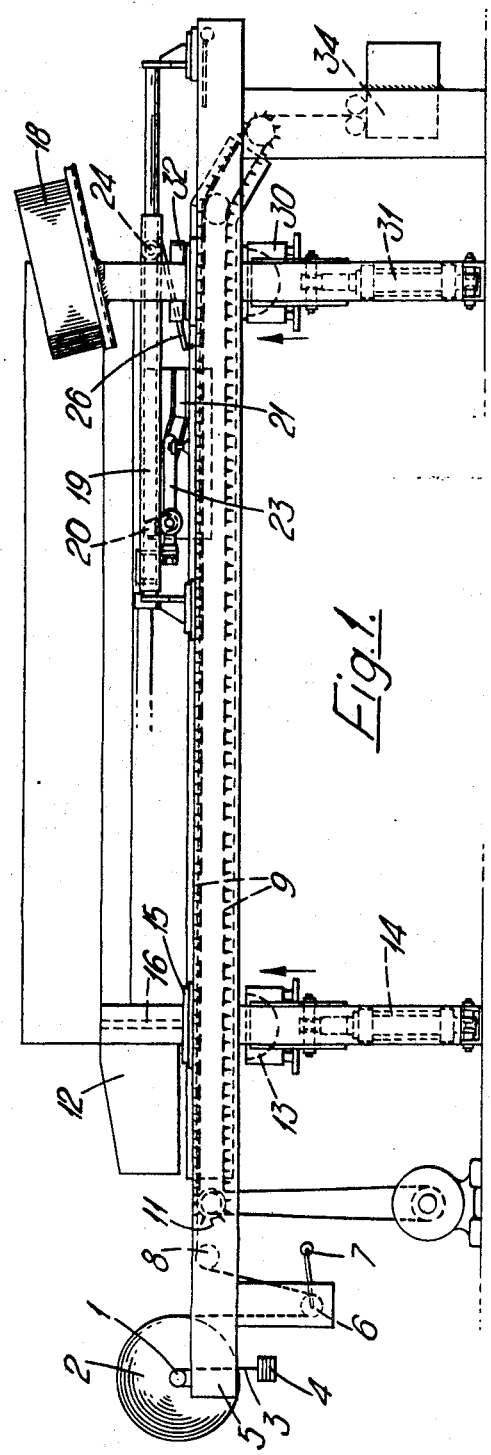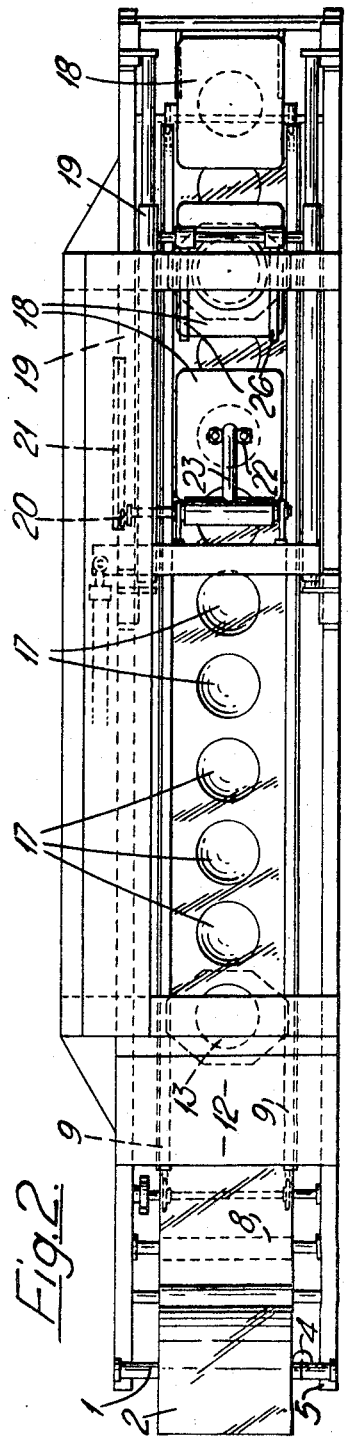

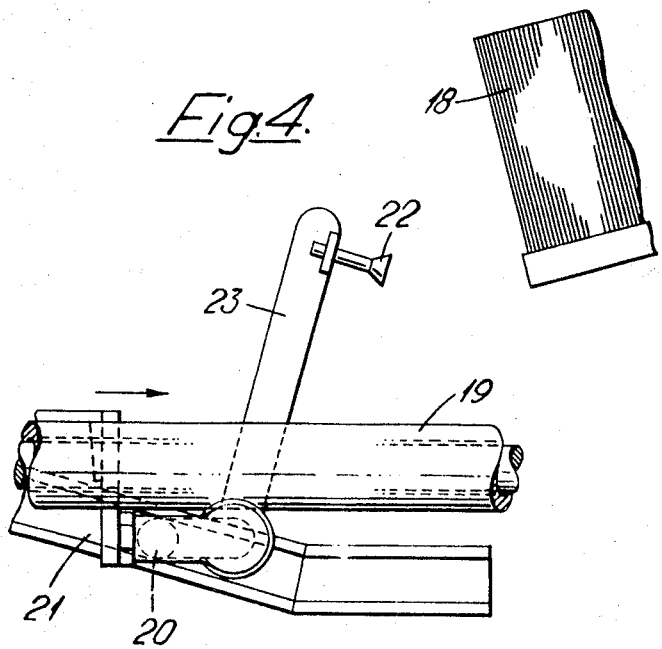
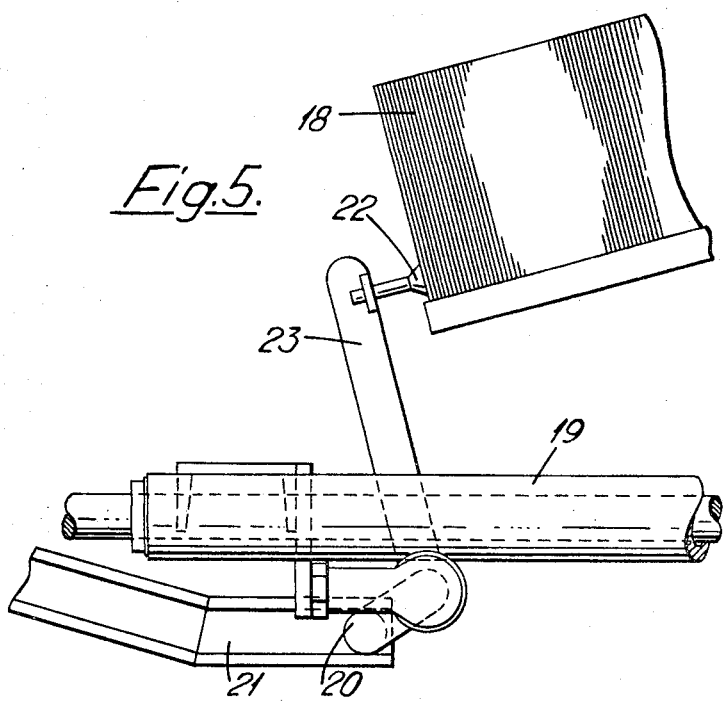

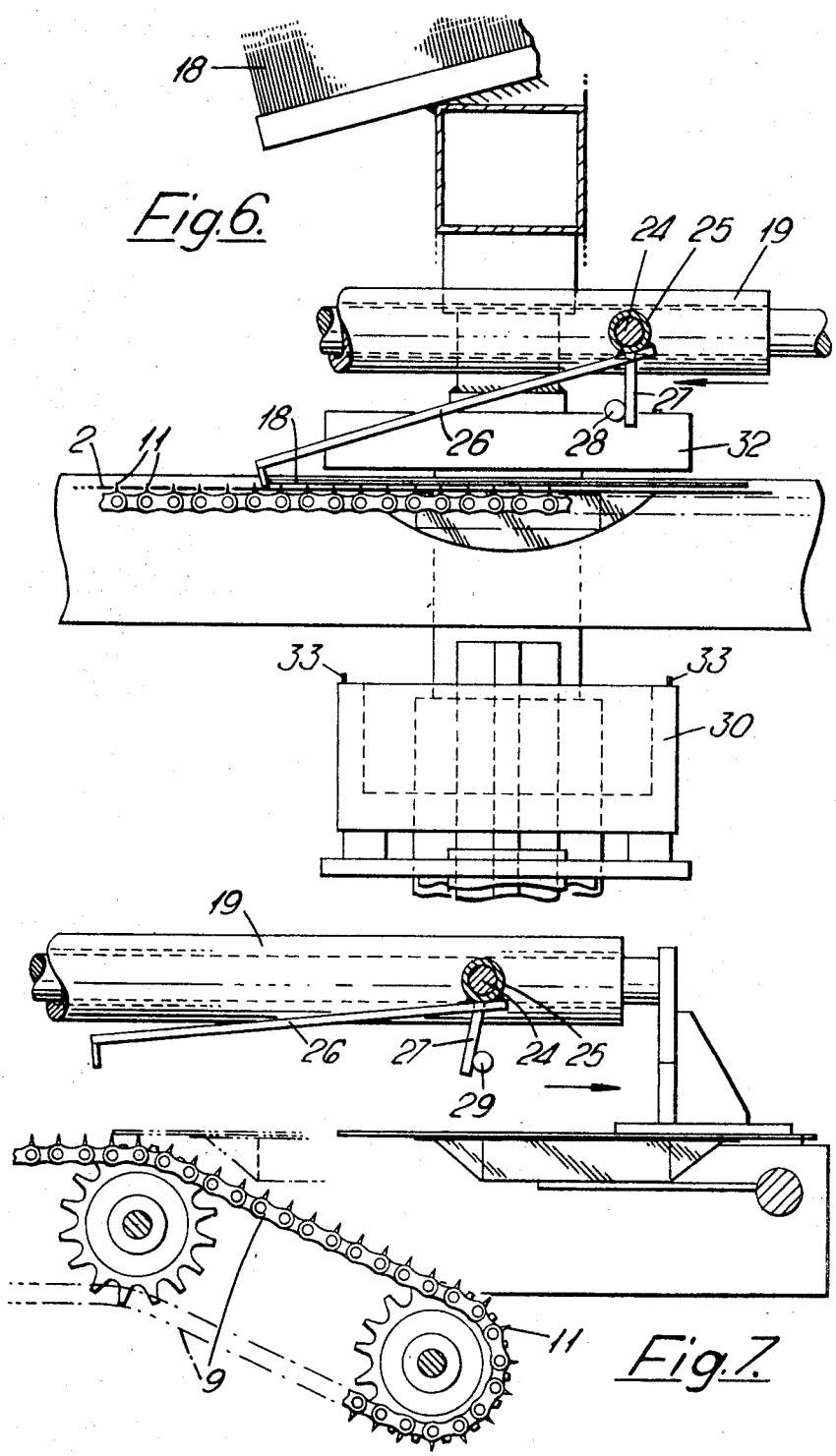

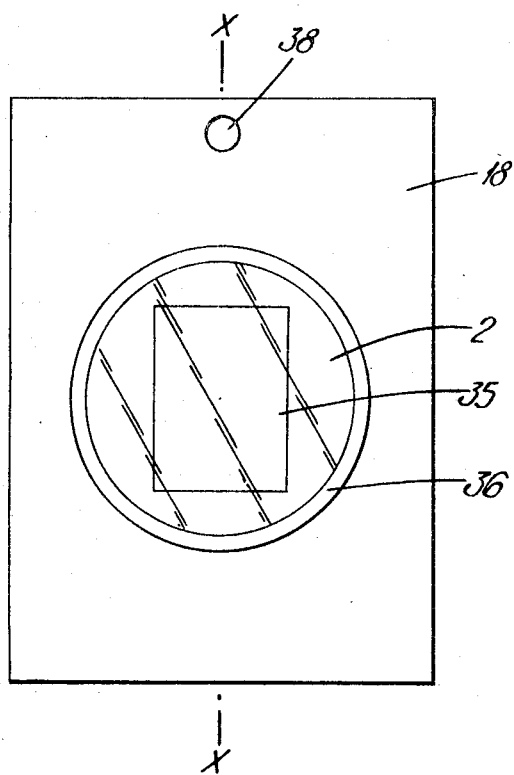
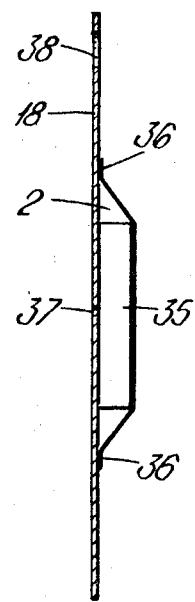

APPARATUS FOR THE PACKAGING OF PRODUCTS

This invention relates to apparatus for the packaging of products and also for the resulting completed packed unit.

Modern packaging includes in many instances the use of thermoplastic sheet material combined with cardboard and various methods are used such as those known as the "skin" packaging, "bubble" packaging, "shrink" packaging, and "stretch" packaging.

The present invention seeks to provide a method and an apparatus which enables a comparatively thin and cheap type of thermoplastic material to be used in an operation which can be regularly intermittent from the source of supply of the sheet material up to the completed package.

Throughout the specification and claims any reference to "products" will include a wide description of objects or goods, for instance, medicinal pills, dry batteries, hardware, smoker's requisites, bottled products, or any other kind of goods which may be packed in conjunction with a sheet of cardboard or similar material.

The invention consists of apparatus for packaging a series of products and comprises a conveyor moving stepwise in one sense of direction adapted to support and convey a web of thermoplastic sheet material (such as polyethylene or P.V.C., or any such material), a station in the path of the conveyor comprising heating means, a mold, and forming means to mold a depression in the said web of thermoplastic sheet material, a station whereat a product may be placed in each such depression, a station at which an intermittently and synchronously acting card-feeding device places an individual card over each depression in sequence, a further station at which such card and the margins of the web around the depression are sealed together and heat is applied to form a depression and means for parting the sealed depression so formed from the web. The complete package may be trimmed and the plastic film further shrunk when necessary.

Means may be provided whereby the completed package continues along the conveyor for collection or packing and the waste sheet material is fed or allowed to drop into a receptacle.

The shaping of the depression in the sheet material may be carried out by first heating the material and then arranging for a mould or die to be moved against the softened material and air pressure or vacuum applied to the sheet material so that it is shaped into the mould or die.

The placing of the card in position over the depression in the film is arranged by means of vacuum-operated "fingers" which lift a card from the source of supply, the operation being controlled by a reciprocating mechanism and a system of levers and guides.

The use of the term "thermoplastic film" is intended to apply to any of the known types of plastic material such as polyetheylene, P.V.C., or other thermoformable film. The term "depression" is applied to also a shaped recess or "bubble" formed in the sheet material and this may be formed by heat and air-pressure heat and suction, or by creating a vacuum.

One convenient form of the invention is illustrated by way of example in the accompanying diagrammatic drawings, in which:

FIG. 1 is a side elevation (diagrammatically) of the apparatus;

FIG. 2 is a plan view of FIG. 1;

Figure 3:
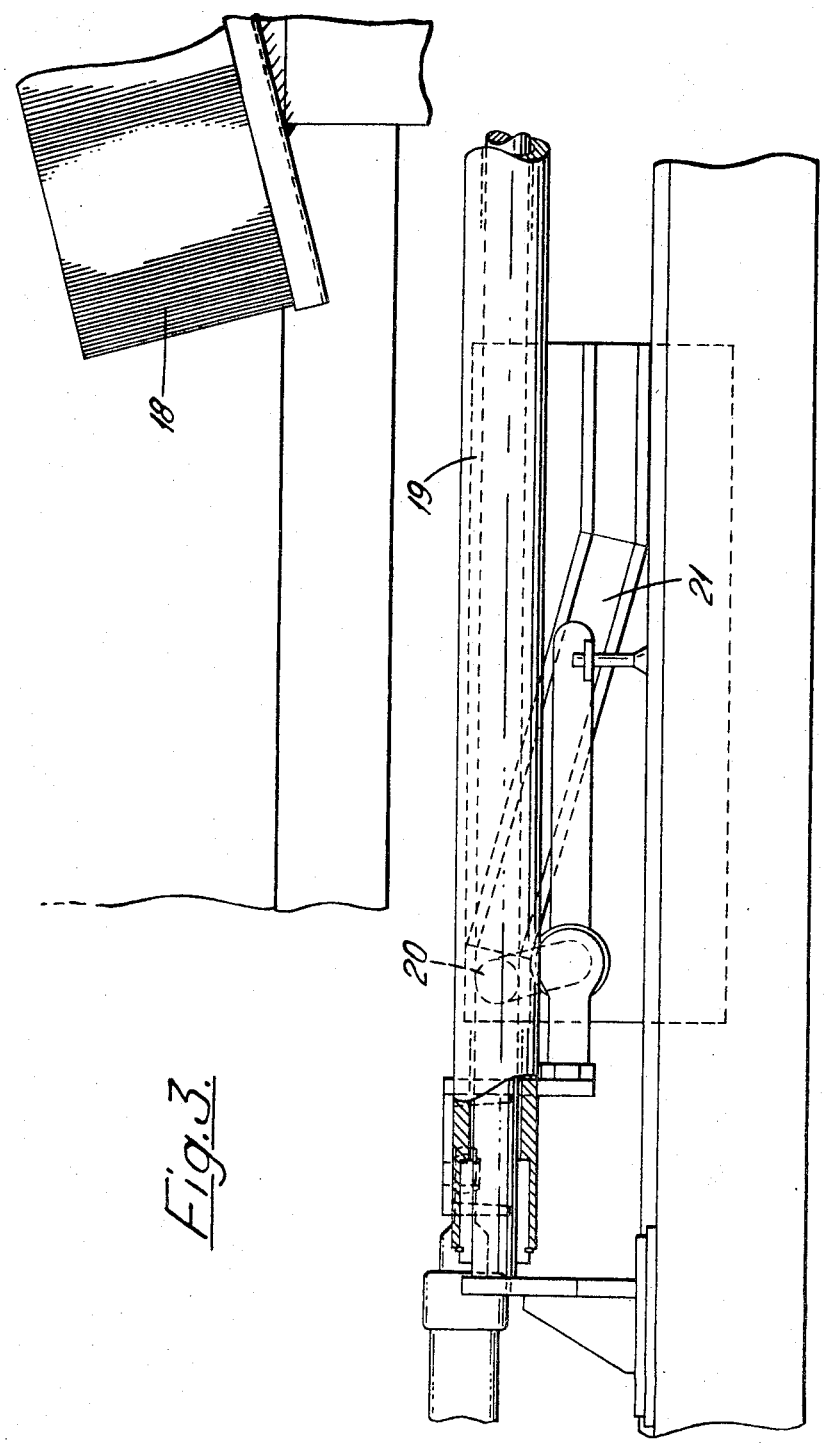

FIG. 3 indicates reference to the mechanism for placing the cards in position;

FIGS. 4 and 5 illustrate differing positions of the lifting finger(s) for the movement of the cards;

FIG. 6 represents the sealing position and the cutting of the sheet material; and FIG. 7 illustrates the normal final movement of the package and the mechanism (which is also shown in FIG. 6) for bringing the completed package out of the sealing position;

FIG. 8 illustrates an example of a complete package;

FIG. 9 is a section on the line X-X of FIG. 8.

The apparatus is mounted on a tablelike construction and at one end there is provided a support 1 on which a reel of thermoplastic flexible plastic film 2 may be held. A flexible band 3 to which a weight 4 is attached may be attached to the framework 5 and passed over the support 1 as a restraining influence of the free rotation of the film 2. The free end of the film 2 is fed onto the main apparatus and in order to assist in the free flow of the film which will be pulled by a series of movements, the film passes around a floating roller 6 pivotally mounted on arm 7. The film 2 passes over a further roller 8 and then onto the apparatus proper where it is "picked up" or "grasped" onto an endless conveyor or chain 9. In the drawing this conveyor 9 consists of a pair of chains arranged parallel to each other and operated by a pneumatic, hydraulic, or other power means. In the form illustrated, the conveyor consists of a chain provided with projections or spikes 11 which pierce into the film 2 for movement of the film through the apparatus. As an alternative to the spikes 11, the film could be gripped by suitable clips. Naturally, the distance between the two parallel chains 9 can be adjusted to suit the width of the film 2.

The chains 9 are moved in a regularly intermittent manner, step by step. Again, this movement can be adjusted to suit the sizes of the packages required.

When the film 2 is fixed through the spikes 11 onto the chain 9 it moves along the apparatus in close proximity to an electric heater 12. This heater 12 may be any normal type of bar heater and may be a reflective means to direct the heat onto the film and particularly to the area of the film which is to be depressed. The effect of the heater is to soften an area of the film 2 at one of its intermittent stops. Its next movement is to be placed where the depression or bubble is formed. This is carried out by means of a mold which can be raised and lowered in synchronous movement with the movement of the film, the raising and lowering being controlled by pneumatic, hydraulic, or other power indicated by 14. When the film 2 reaches the position so that a heated and softened section of the film is arranged over the mold, the mold is moved upward and, simultaneously, a plate 15 may be moved towards the mold and through the pipe 16 a flow of air forces the softened film into the shape of the mold 13. This shaping may also be done by vacuum means through the mold 13 or by a mechanical plug. The next step is for the mould to be returned to the position shown in FIG. 1, and the film 2 is moved along its path with the depression or "bubble" formed as indicated in FIG. 2 by the reference 17. At this stage, the product or products to be packed are placed into one of the depressions. The filling can be mechanically arranged, many devices for such purpose being known.

The next operation is the placing of a card over the filled depression 17. A supply of cards is arranged and shown at 18 and one card (or more cards) at a time is picked up mechanically from the supply and placed in position over the filled depression which contains the product. In conjunction with the other movements of the apparatus a reciprocating bar 19 is provided on which the mechanism for the placing of the cards in position is arranged. In FIG. 3 the mechanism shows the bar 19 in the position when a card is being placed onto the film. To the bar 19 is connected through linkage-controlling bars a guide 20 sliding through a channel-sectioned runway 21. As the bar 19 moves backwards and forwards, the guide 20 slides within the runway 21 and the shaping of this runway causes the main arm 23 to change its angle of direction. To the end of the arm 23 is attached a pair of suction fingers 22. In FIG. 5 these suction fingers 22 are placed through the linkage movement against the supply of cards 18 and suction is provided so that one card is lifted from the supply and lifted from the support and moved so that the card is finally placed within guides to be placed in position over the filled depression. FIG. 3 shows the position of the mechanism at the time when the card is being placed within guides over the plastic film 2. As the bar 19 moves in the direction of the arrow in FIG. 4, the guide 20 slides in in the runway 21 and because of the angle of the runway the arm 23 moves relatively and FIG. 4 shows the arm 23 being positioned to enable the suction fingers 22 to come into contact with the stacked cards 18 and FIG. 5 shows the guide 20 at one end of the runway 21. As the reciprocating bar moves in the reverse direction, the card is first removed from the stack and later in the movement the card is lowered onto guides above the film by releasing the suction on the pads 22. At this stage, the film 2 is being moved intermittently by virtue of the fact that it is held onto the conveying chain 9 but the card has been merely placed in position. In order to bring the card into position over the filled depression for sealing and trimming, there are provided mechanical guides and fixed fingers to bar 19.

The sealing and trimming is carried out by heat and pressure at the sealing station. The intermittent stops can be on a basis of say 5 to 6 seconds in time. An electric heating element combined with pressure means shown by reference 30. This is brought into position for operation by pneumatic, hydraulic, or other means 31 and a pressure plate 32 is provided so as to clamp the film and the card in close proximity. Suitable heat pressure is applied around the depression so as to cause the film 2 to join onto the board around the contents of the depression. It has been found that a temperature of 150° to 250° C. is desirable to effect this sealing. At the same time, however, the heat can be varied so as to cause the film to shrink around the contents in the depression. This operation for film shrinking can be repeated on a separate station later if desired. Simultaneously with the heat sealing, there is provided a continuous cutter 33 extending slightly beyond the heating element 30 and this cutter will cut around the part sealed so that the package is complete, i.e., the film is sealed onto the card and trimmed. After the sealing, the completed package passes out of the apparatus by rakelike arms and can be dropped or positioned in any suitable manner. An example for movement of the completed package is that attached to the reciprocating bar 19 is mounted a projecting shaft 24 having a collar 25 which is supported on the shaft with an amount of resistant friction so that the collar will remain in one position on the shaft unless it is deliberately moved. To the collar 25 is attached a rakelike arm 26 and also a projection 27. On the fixed apparatus there are provided two stops 28, 29. As the bar 19 reciprocates it carries with it the shaft 24 together with the collar 25 and the attachments 26 and 27. When the projection comes into contact with the stop 29, the collar 25 will partially rotate around the shaft 24 causing the rakelike arm 27 to lift and be free from the completed card. As the bar moves in the other direction, the projection 27 will come into contact with the stop 28 causing the rakelike arm 26 to drop behind the card so that when the bar 19 next moves it will bring the card from the sealing position and out of the machine.

The completed package may be passed into a position for additional heat shrinking and trimming of the card, for instance when more than one package is made at the same time. The trimmed waste film will follow the pathway of the chain 9 for a time but will be taken off the spikes 11 into a container 34.

If desired additional means may be provided for lifting up the completed package and turning it over for packing in stacks. The lifting means may be of the similar type and nature as the card-lifting mechanism.

Brushes or any other cleaning means may be provided to keep the chains and belts clean or the film after the packaging has been completed.

It will be appreciated that the description illustrates one depression for each movement but additional molds can be provided for any suitable number of depressions to be made at the same time and, similarly, the subsequent arrangements on the apparatus can be multiplied. The cards may also be trimmed or even cut up to form several completed packages. For instance, if the products to be packed are small, provision could be made to provide say three or four depressions at each operation and one card arranged to cover the depressions and then the card cut into completed packages.

Similarly, the apparatus may be adjusted to take various sizes of film and the actual form and dimensions of the depression may be varied.

The invention also includes the completed package wherein the thermoplastic film 2 is softened, formed and after filling, is sealed on to a cardboard base and the film is shrunk back around the contents. An example is given in FIGS. 8 and 9, FIG. 8 being a front view of a complete package and FIG. 9 a sectional view. The base of the package is the cardboard 18. The reference 2 indicates the plastic film into which the contents 35 have been placed and the plastic film is sealed around the contents on to the cardboard 18 as indicated at 36. In the sealing the film 2 is shrunk so that the contents are held in position. The board may be provided with a hole 37 to allow air to escape from the package. A hole 38 may also be provided in the card for suspending the goods for sale.

It will be appreciated that incidental changes can be made without affecting the invention. For instance, reference is made to two pneumatic fingers for picking up the cards but any suitable number may be adapted.

It will also be appreciated that the synchronous movement of the various parts will be arranged. The endless chain or belt will be moved in a series of steps with a possible pause for each operation and at these pauses the other operations will take place, i.e., the heater will soften the plastic film, the molding of the depressions will take place and this will mean the movement of the mold into position and the application of air pressure. Similarly, the reciprocating movement of the bar 19 will result in the cards being placed in position and the completed package being placed in position for sealing. The sealing and trimming will also be controlled during the pauses in the movement. The air pressures and the suction to be applied for the fingers will be supplied through normal means, cutoff valves being installed to correspond with the appropriate operation.

When reference is made to the cards, these may be of any suitable material or thickness.

I claim:

1. Apparatus for packaging products, which comprises a conveyor for supporting and conveying a web of thermoplastic material, heating means for heating the web conveyed by said conveyor, means for forming depressions in the heated web, means for inserting a product in each depression, means for placing a card over each depression, means for sealing each card to the web around the associated depression, and means engageable with the web surrounding each depression in opposition to the associated card for cutting through the web against the card, without cutting through the card, and for separating the depression with the card sealed thereto from the web carried by said conveyor.

2. Apparatus as claimed in claim 1 in which the conveyor comprises an endless chain provided with extending spikes arranged to pierce and hold the thermoplastic sheet material in position during the operation.

3. Apparatus as claimed in claim 1 in which the conveyor incorporates clips for grasping and holding the plastic sheet material during the operation.

4. Apparatus as claimed in claim 1 having the said heating means comprising an electric radiant heater arranged adjacent the plastic sheet material.

5. Apparatus as claimed in claim 1 wherein the forming means comprises a shaped mold and adapted to be brought adjacent the heated plastic material and means to create an air pressure differential to the sheet material so as to conform it to the mold.

6. Apparatus as claimed in claim 5 wherein the air pressure differential creating means produces positive pressure.

7. Apparatus as claimed in claim 5 wherein the air pressure differential creating means produces negative pressure.

8. Apparatus as claimed in claim 1, the forming means comprising a shaped mold adapted to be brought adjacent the softened plastic material and a correspondingly shaped plug on the opposite side of the plastic material arranged to depress the material into the mold.

9. Apparatus as claimed in claim 1 wherein the forming means has hydraulic positioning means.

10. Apparatus as claimed in claim 1 wherein the forming means has mechanical positioning means.

11. Apparatus as claimed in claim 1 wherein the forming means has pneumatic positioning means.

12. Apparatus as claimed in claim 1 having a card-feeding device comprising a support for such cards, and at least one suction cup carried by an oscillating arm synchronized with the step motion of the conveyor.

13. Apparatus as claimed in claim 12 wherein the arm supporting the suction cup has means for moving it by a reciprocating bar through levers, the angles of which are varied by means of a slideway so that the suction cup will lift a card from its support and place the said card in position over a depression in the plastic film.

14. Apparatus as claimed in claim 1 having an additional means to move the card covering the depression into position for sealing.

15. Apparatus as claimed in claim 1 wherein the sealing means comprise a heated pressure plate movable into operation against the package.

16. Apparatus as claimed in claim 15 wherein the heated pressure plate has hydraulic positioning means.

17. Apparatus as claimed in claim 16 wherein the said pressure plate is provided with said cutting means.

18. Apparatus as claimed in claim 1, further comprising means for moving the completed and filled package and comprising fingers operated through levers connected to reciprocating mechanism, said levers being frictionally supported on an axis and brought into and out of position by abutment against stops provided on the apparatus.

19. Apparatus as claimed in claim 1, further comprising means feeding the waste sheet material after cutting into a container.

20. Apparatus as claimed in claim 1 having means to fill and seal a plurality of packages simultaneously and comprising means for parting such packages into single packages.

21. Apparatus as claimed in claim 15 wherein the heated pressure plate has means for heating it to temperatures of 150° C/ to 250° C.

22. Apparatus as claimed in claim 1, wherein said sealing means and cutting means have conjoint-operating means for sealing and cutting each depression substantially concurrently.

23. Apparatus as claimed in claim 1, wherein said conveyor has means for moving it stepwise in one direction, and wherein said card-placing means comprises an intermittently operated card-feeding device operated synchronously with said conveyor.

24. Apparatus as claimed in claim 1, further comprising means for heating the depressions sealed to said cards for shrinking the plastic material of the depressions.